United States Patent [19]
Lyons et al.

[11] Patent Number: 6,081,650
[45] Date of Patent: *Jun. 27, 2000

[54] TRANSPORT PROCESSOR INTERFACE AND VIDEO RECORDER/PLAYBACK APPARATUS IN A FIELD STRUCTURED DATASTREAM SUITABLE FOR CONVEYING TELEVISION INFORMATION

[75] Inventors: Paul Wallace Lyons, New Egypt, N.J.; Alfonse Anthony Acampora, Staten Island, N.Y.

[73] Assignee: Thomson Licensing S.A., Boulogne Cedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/750,442

[22] PCT Filed: Jun. 13, 1995

[86] PCT No.: PCT/US95/07458

§ 371 Date: Dec. 6, 1996

§ 102(e) Date: Dec. 6, 1996

[87] PCT Pub. No.: WO96/01025

PCT Pub. Date: Jan. 11, 1996

[30] Foreign Application Priority Data

Jun. 30, 1994 [GB] United Kingdom .................. 9413169

[51] Int. Cl.[7] .................................................. H04N 5/76
[52] U.S. Cl. ............................................. 386/95; 386/111
[58] Field of Search .................... 386/33, 109, 111–112, 386/95; 348/423; 360/8; H04N 5/76, 5/92, 7/12

[56] References Cited

U.S. PATENT DOCUMENTS

| | | | |
|---|---|---|---|
| 4,807,053 | 2/1989 | Heijnemans | 358/335 |
| 4,953,020 | 8/1990 | De With | 358/133 |

(List continued on next page.)

FOREIGN PATENT DOCUMENTS 0309280 of 0000 European Pat. Off. .

(List continued on next page.)

OTHER PUBLICATIONS

*Patent Abstracts of Japan, vol. 14, No. 32, Jan. 22, 1990 and Japanese Pat. No. 1–265794.

(List continued on next page.)

Primary Examiner—Thai Tran
Attorney, Agent, or Firm—Joseph S. Tripoli; Eric P. Herrmann; Ronald H. Kurdyla

[57] ABSTRACT

A transmitted high definition television signal is represented by a packetized datastream configured as a sequence of data fields (FIG. 1) with a non-uniform data rate due to unequal inter-data overhead information intervals. Each data field is prefaced by a Field Sync overhead segment followed by 312 packetized data segments each with associated overhead information (FEC). At a transmitter (FIG. 33), a transport processor (14) forms data packets with associated headers and exhibits uninterrupted operation at a constant uniform data rate, while supplying a packetized datastream to a network (17) which constructs sequential data fields by inserting the non-data overhead information into the datastream. The transport processor is advantageously operated at a constant uniform data rate without having to modify the original data field structure to accommodate the needs of the data field construction network. This result is facilitated by transferring data from the transport processor to an associated interface/buffer network (46) in response to a ⅜ symbol clock, in combination with a predetermined buffer fullness level. Specifically, a video recorder/playback device (15) receives a constant uniform data rate packetized datastream from the transport processor, and outputs a constant uniform data rate datastream to the interface/buffer network. A counterpart transport processor/decoder (86) at a receiver (FIG. 34) coacts with a data field processor (75) and similarly exhibits uninterrupted operation at a constant uniform data rate. A video recorder/playback device (85) receives a constant uniform data rate datastream from an interface/buffer (84) after removal of overhead information, and outputs a constant uniform data rate datastream to the transport decoder.

10 Claims, 13 Drawing Sheets

U.S. PATENT DOCUMENTS

| | | | |
|---|---|---|---|
| 5,134,476 | 7/1992 | Aravind et al. | 358/133 |
| 5,444,490 | 8/1995 | De With et al. | 348/423 |
| 5,452,015 | 9/1995 | Hulyalkar | 348/21 |
| 5,566,174 | 10/1996 | Sato et al. | 348/423 |
| 5,649,047 | 7/1997 | Takahashi et al. | 386/111 |
| 5,793,927 | 8/1998 | Lane | 348/423 |

FOREIGN PATENT DOCUMENTS

| | | |
|---|---|---|
| 0353757 | of 0000 | European Pat. Off. . |
| 0501699 | of 0000 | European Pat. Off. . |
| 0505985 | of 0000 | European Pat. Off. . |
| 1-265794 | of 0000 | Japan . |

OTHER PUBLICATIONS

Fourth International Colloquium on Advanced Television Systems, Jun. 25, 1990, Ottawa, CA, S. Cucchi et al "Bit Rate Reduction Codec for HDTV: Architecture and Hardware Implementation", pp. 3B.5.1–3B, 5.9.

A copending International Patent Application No. PCT/US94/00739 of Charles Martin Wine, internationally filed Jan. 19, 1994.-

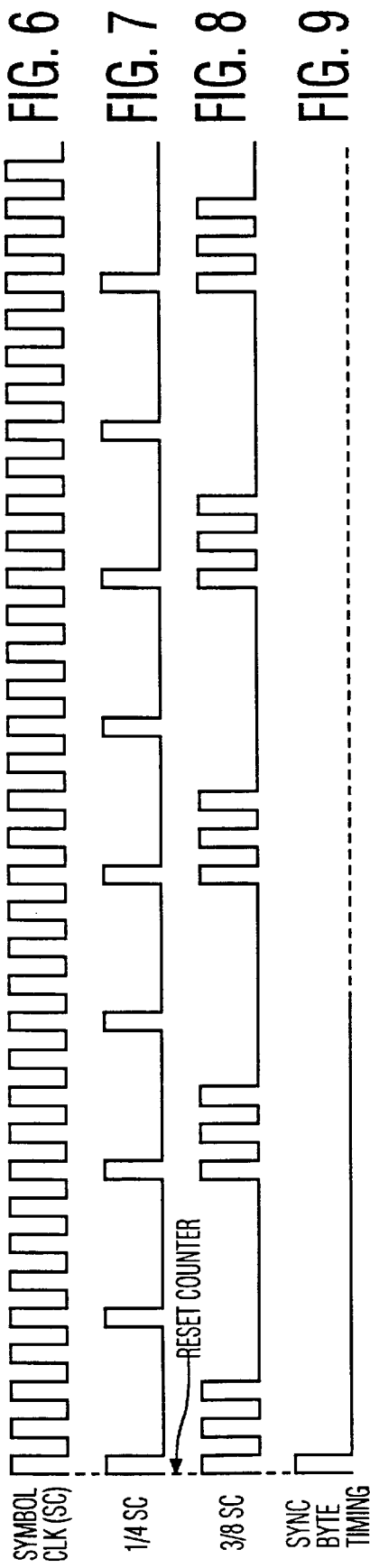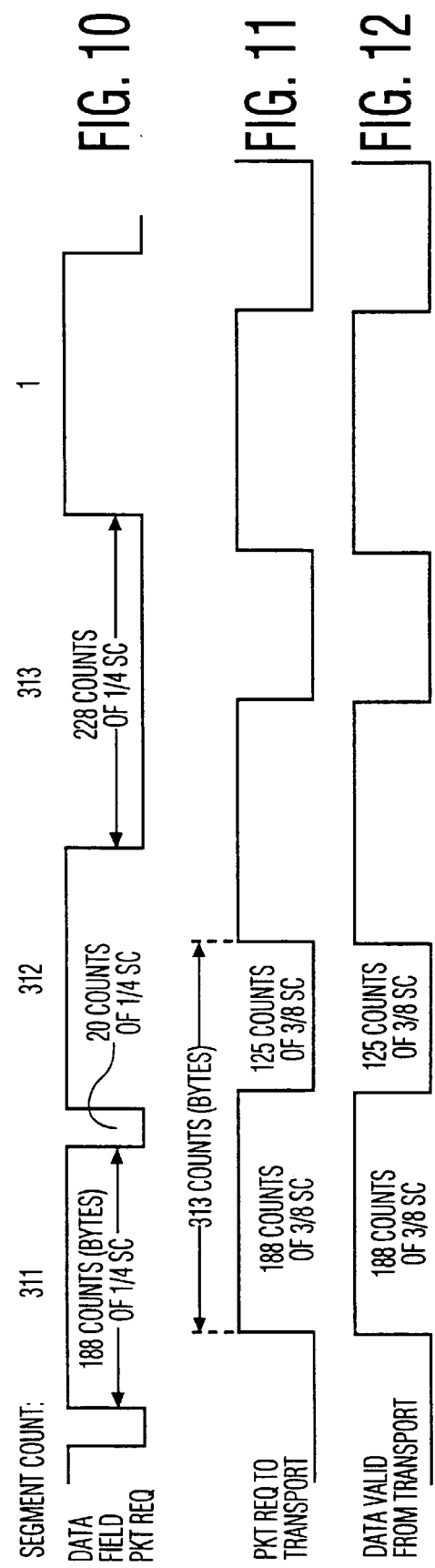

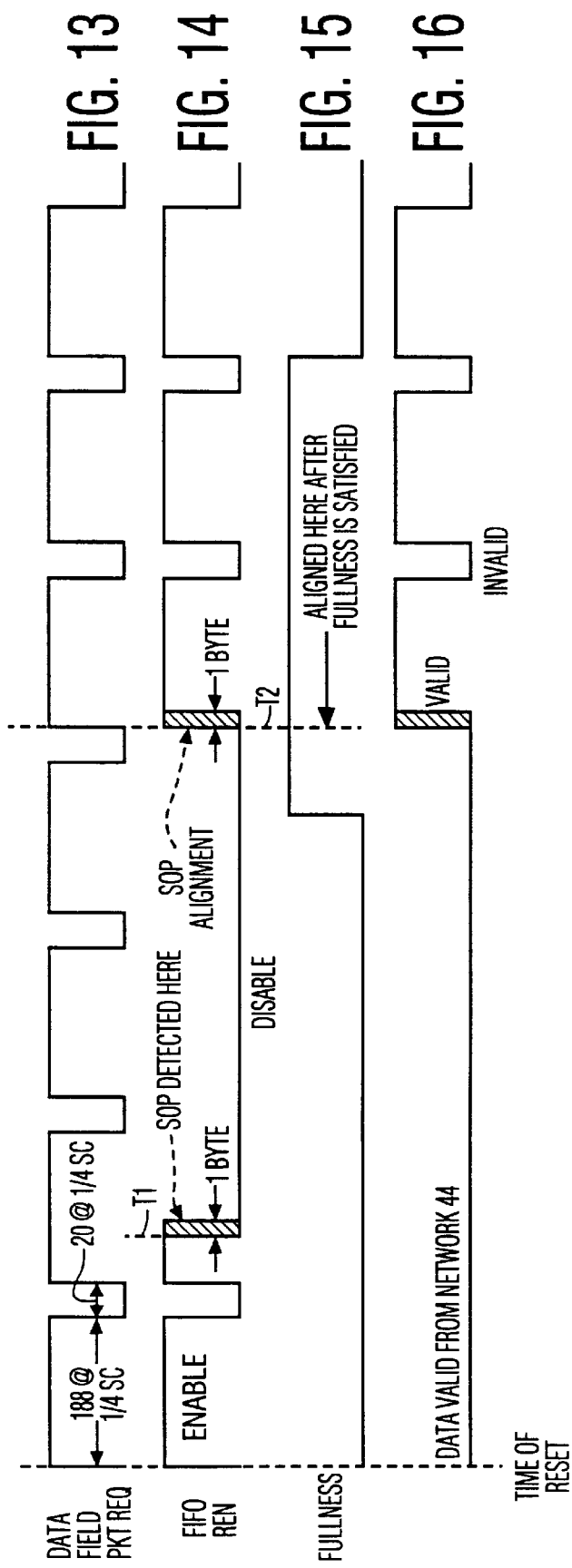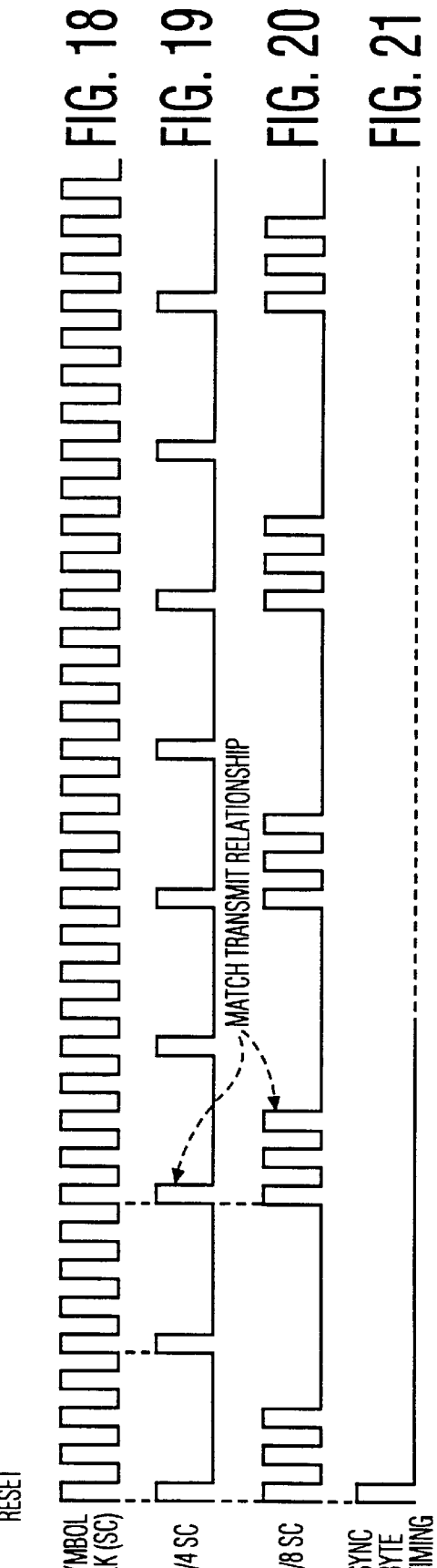

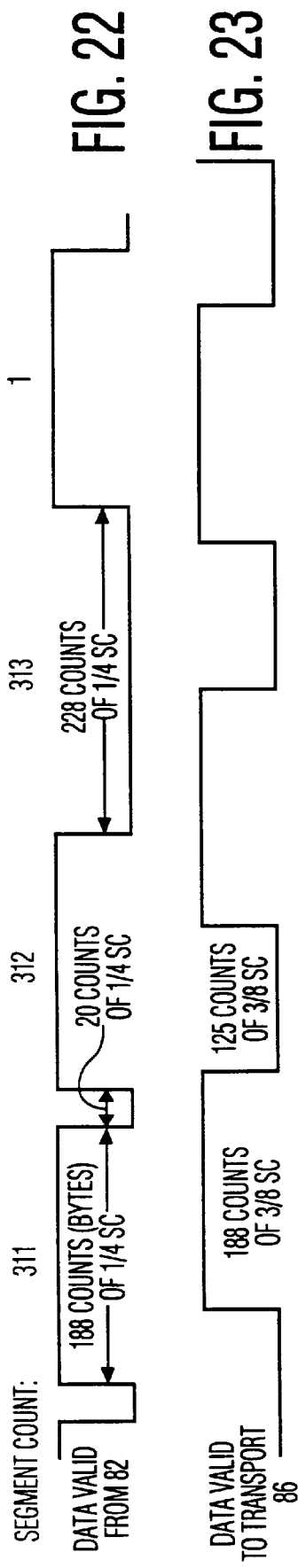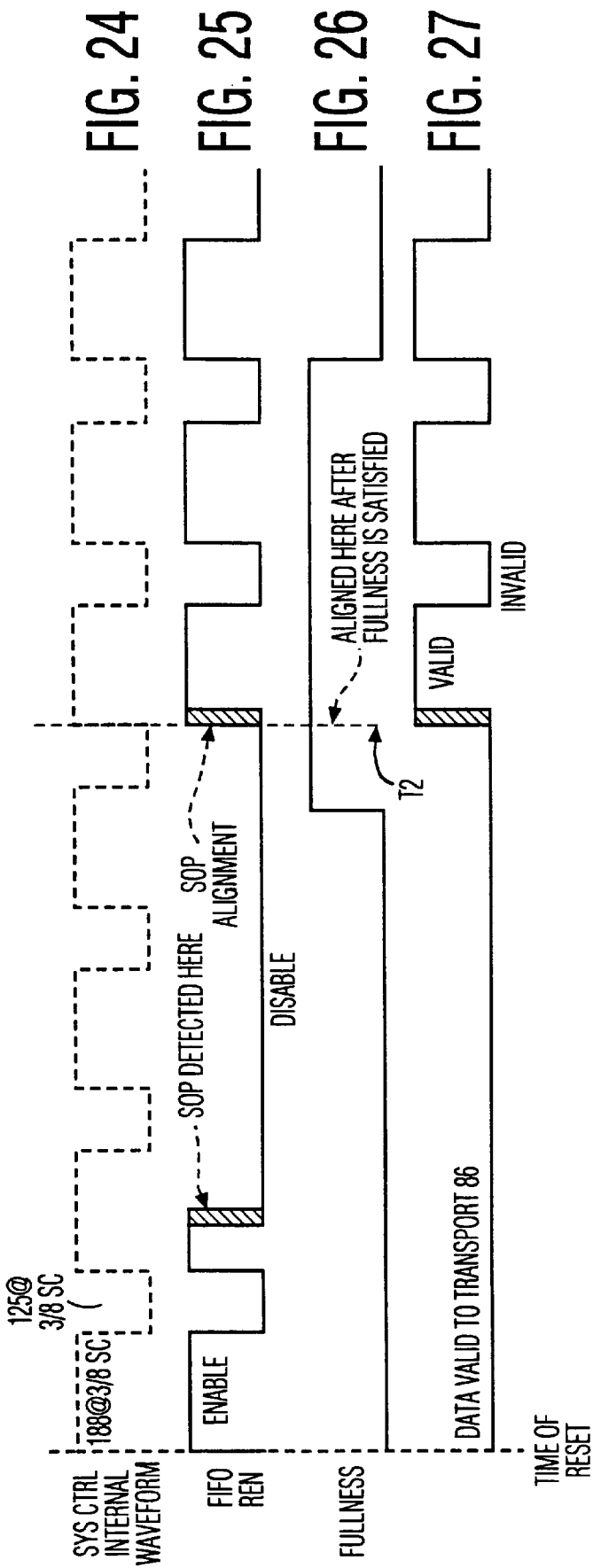

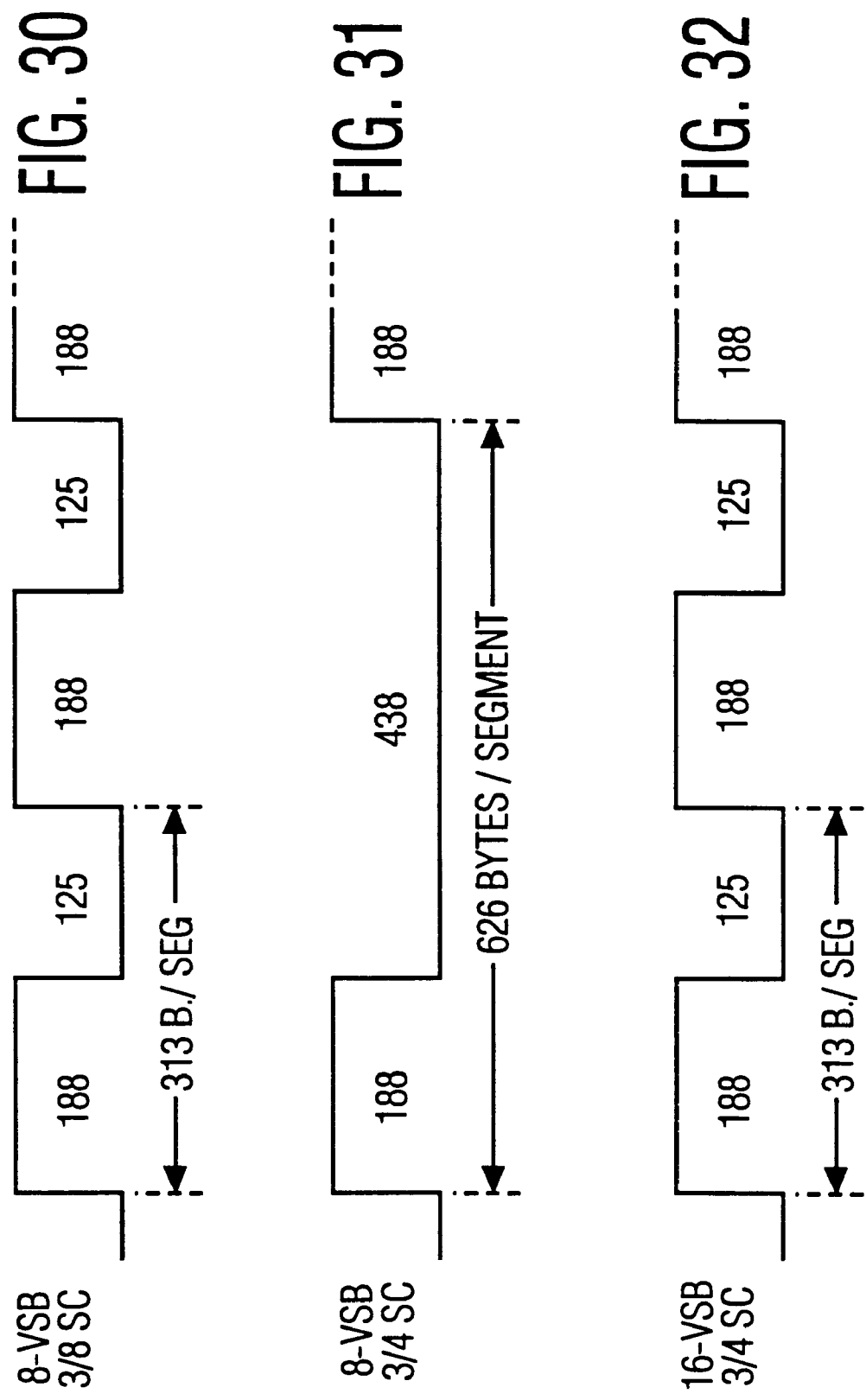

TRANSPORT PROCESSOR INTERFACE AND VIDEO RECORDER/PLAYBACK APPARATUS IN A FIELD STRUCTURED DATASTREAM SUITABLE FOR CONVEYING TELEVISION INFORMATION

FIELD OF THE INVENTION

This invention is related to the field of digital signal processing. In particular, the invention concerns a system to facilitate video record/playback operation while processing a field structured datastream suitable for conveying high definition television (HDTV) information.

BACKGROUND OF THE INVENTION

Recent developments in the field of video signal processing have produced digital high definition television signal processing and transmission systems. One such system is described in U.S. Pat. No. 5,168,356—Acampora et al. In that system, a codeword datastream, including codewords compatible with the known MPEG data compression standard, is conveyed to a transport processor. A major function of the transport processor is to pack variable length codeword data into packed data words. An accumulation of packed data words, called a data packet or data cell, is prefaced by a header containing information identifying the associated data words, among other information. Thus an output from the tranport processor is a packetized datastream comprising a sequence of transport packets. The transport packet format enhances the prospects of resynchronization and signal recovery at a receiver, e.g., after a signal disruption which may result from a transmission channel disturbance. This is accomplished by providing header data from which a receiver can determine re-entry points into the datastream upon a loss or corruption of transmitted data.

A high definition television (HDTV) terrestrial broadcast system recently proposed as the Grand Alliance HDTV system in the United States employs a vestigial sideband (VSB) digital transmission format for transmitting a packetized datastream with a prescribed data field structure. The Grand Alliance HDTV system is a proposed transmission standard that is under consideration in the United States by the Federal Communications Commission (FCC) through its Advisory Committee of Advanced Television Service (ACATS). A description of the Grand Alliance HDTV system as submitted to the ACATS Technical Subgroup Feb. 22, 1994 (draft document) is found in the 1994 Proceedings of the National Association of Broadcasters, 48th Annual Broadcast Engineering Conference Proceedings, Mar. 20–24, 1994.

In the Grand Alliance system, data is arranged as a sequence of data fields. Each field structure includes 313 segments: a field sync segment (which does not contain payload data) followed by 312 data segments. Each data segment includes a data component and a forward error correction (FEC) component. A synchronizing (sync) component prefaces each data segment. A transport processor provides fixed length 188 byte packets to a transmission processor, which performs various coding functions on each packet to produce output symbol segments to be conveyed to an output transmission channel. Each byte comprises a predetermined number of symbols, e.g., 4 symbols. The data packets contain data in conformance with the ISO-MPEG (International Standards Organization-Moving Pictures Experts Group) MPEG-2 data compression standard. The transport processor provides only the data packets to the transmission processor, which adds an overhead FEC error detection and correction component to each segment, and an overhead field sync segment at the beginning of each data field, ie., between each group of data field segments. The rate of data flow must be regulated to perform these operations since, as will be seen, the overhead FEC components and the overhead field sync segment occur at different times and exhibit different durations.

The packets are separated by an interval which permits overhead required by each data segment (e.g., FEC data) to be inserted into the datastream by the transmission processor. However, the packet datastream must be interrupted and delayed for a period of time equal to a segment interval when the longer duration field sync segment, which does not contain a data payload like the other packets, is to be inserted into the datastream. A datastream created by the need to interrupt and insert different duration overhead information (FEC and Field sync) at different times is illustrated by FIG. 3. This datastream comprises 312 packet byte plus FEC intervals between Field sync intervals, as will be discussed.

SUMMARY OF THE INVENTION

The inventors have recognized that an interrupted datastream as mentioned above not only undesireably reduces the data throughput rate, but also produces non-uniform intervals between data packets. The occurrence of such non-uniform inter-packet intervals significantly complicates the signal processing requirements.

In particular, the inventors have recognized that an interrupted data stream undesirably complicates the interfacing requirements between the transport processor and the transmission processor at the transmitter, particularly with respect to data synchronization, and between any system for recording and playing back the packetized datastream. It is very likely that an HDTV datastream will be subject to recording by either studio or consumer equipment. To satisfy MPEG timing requirements, any recording system must faithfully reproduce the packet timing, including any non-uniform gaps between packets, which must be maintained between the packets as such gaps occurred. This requirement significantly increases the complexity of circuits needed to interface to a recording system. In addition, any such gaps produced by transmission processing must be maintained at a demodulator in a receiver.

The present invention is advantageously employed in the context of a system intended to process a packetized datastream representing a predetermined sequential data field structure. A system according to the invention eliminates the need to align the data field structure, which may be of the type exhibiting a non-uniform data rate due to different types of non-data overhead information of different duration such as that employed by the Grand Alliance HDTV system as described above.

At a transmitter, a transport processor (e.g., for forming data packets with associated headers) is operated at an uninterrupted constant uniform data rate in a system which inserts non-data overhead information of different duration into the datastream to form the predetermined sequential data field structure. The transport processor is advantageously operated at such constant uniform data rate without having to modify a predetermined original data field structure. In accordance with the principles of the invention at a transmitter, a video recording/playback device is situated in a constant uniform data rate datastream path from the output of the transport processor.

A counterpart transport processor/decoder at a receiver similarly exhibits uninterrupted operation at a constant uniform data rate. A video recording/playback device is situated in a constant uniform data rate datastream in the input path of the transport processor/decoder.

In a disclosed transmitter embodiment of the present invention, a transport processor operates at an uninterrupted constant uniform data rate in response to a ⅜ SC symbol clock for providing byte data to a buffer interface network at a uniform data rate. The buffer writes data in response to the ⅜ SC clock and reads out data at a non-uniform rate to a data field construction network. The field construction network operates at a non-uniform data rate for producing a sequence of output symbol field structures in response to byte data and non-data overhead information. The data field construction network requests data at a non-uniform rate. The interface network converts this request to a uniform data rate request to the transport processor. A video recorder/playback device is located in signal path between the transport processor and the interface network.

In a disclosed receiver embodiment of the present invention, a received symbol datastream exhibits a sequential data field structure. A data field processor processes the received symbol data field structure at a non-uniform data rate to produce output data at a non-uniform rate. A buffer interface network responds to a ⅜ SC read clock for converting this data to an output MPEG byte datastream exhibiting a constant uniform data rate. This datastream is processed by a transport decoder which exhibits uninterrupted operation at a constant uniform data rate in response to the ⅜ SC SC clock. A video recorder/playback device is located in a signal path between the interface network and the transport decoder.

BRIEF DESCRIPTION OF THE DRAWINGS

In the drawing:

FIGS. 6–16 depict waveforms associated with the operation of the transmitter system shown in FIG. 4.

FIGS. 18–27 depict waveforms associated with the operation of the receiver system shown in FIG. 17.

FIGS. 30–32 depict waveforms helpful in understanding the operation of the invention.

DETAILED DESCRIPTION OF THE DRAWINGS

Figure 1:
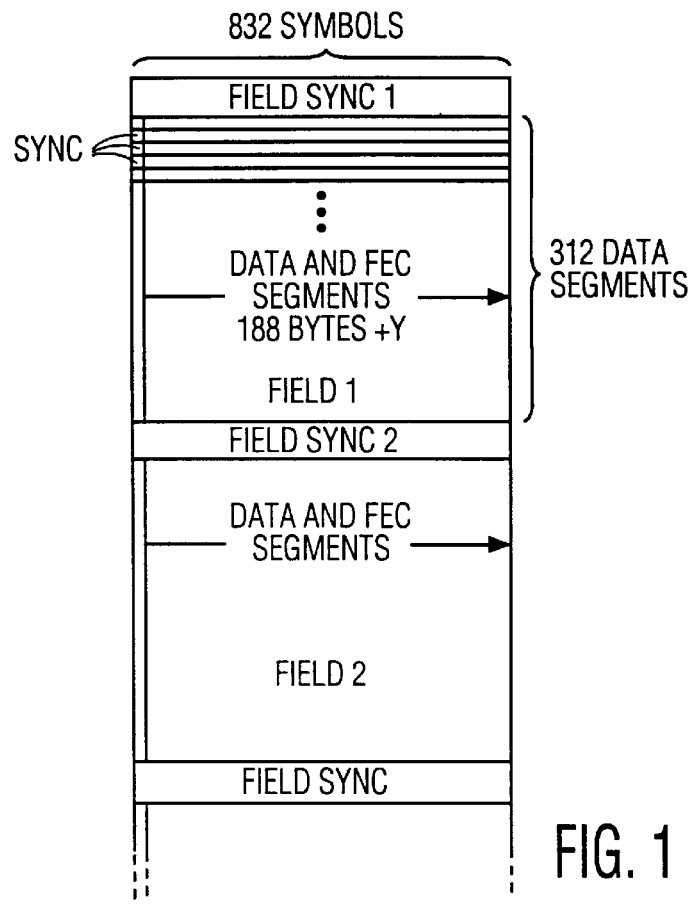
FIG. 1 illustrates a sequential data field structure including synchronizing (sync) and data segments.

FIG. 1 depicts a data field structure proposed for use by the Grand Alliance HDTV system in the United States, in a system for processing a packetized datastream. An output symbol datastream representing the data field structure is produced by a transmission processor in response to input data packets from a preceding transport processor. The transmission processor and the transport processor will be discussed in connection with FIG. 4. Each data field structure includes an overhead field sync segment (which does not contain payload data) preceding a group of field data segments each having an associated sync component. Each field data segment includes an 187 byte data packet component, a one byte sync component prefacing each data segment, and a forward error correction (FEC) component following the data. Associated with each segment is an interval "Y" defining a data disable interval between each data packet. The transport processor provides 188 byte packets of input data plus segment sync to the transmission processor. The transmission processor adds FEC coding and field sync overhead information, and produces output segments in symbol form to be conveyed to an output transmission channel.

The sync component associated with each segment and the field sync component facilitate packet and symbol clock acquisition and phase lock at a receiver under extreme noise and interference conditions. The 4-symbol sync component is binary (2-level) in order to make packet and clock recovery rugged, and exhibits a pattern that repeats regularly at a unique rate to permit reliable detection at a receiver under noise and interference conditions. The sync symbols are not Reed-Solomon or trellis coded, nor are they interleaved. The field sync component may contain pseudo-random sequences, and serves several purposes. It provides a means to determine the beginning of each data field, and may also be used by an equalizer in a receiver as a training reference signal to remove intersymbol and other forms of interference. It also provides a means by which a receiver may determine whether or not to use an inteference rejection filter, and it may be used for diagnostic purposes such as measuring signal-to-noise characteristics and channel response. The field sync component furthermore may be used by phase tracking networks in the receiver to determine phase control loop parameters. Like the sync component, the field sync component is not error coded, trellis coded, or interleaved. In this example the data fields do not necessarily correspond to the interlaced picture fields which comprise a picture frame of an NTSC television signal.

Figure 2:
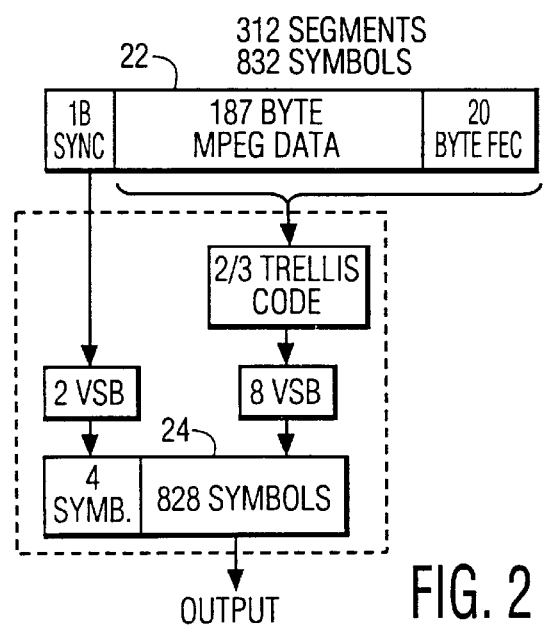
FIG. 2 is a block diagram generally illustrating apparatus for processing a packetized datastream.
Figure 4:
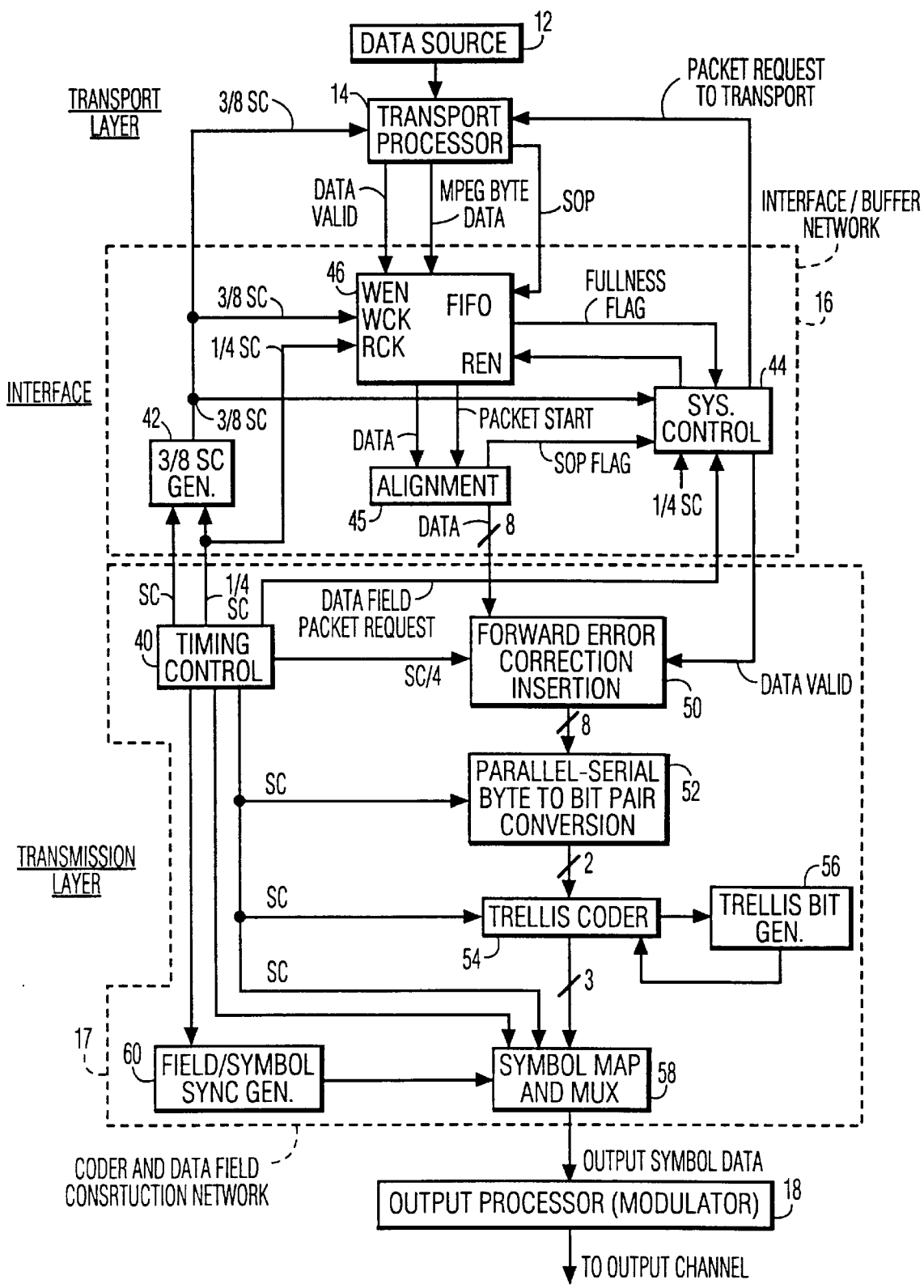
FIG. 4 is a block diagram of a transmitter encoder, including a buffer/interface network and data field structuring network, suitable for use with video recorder apparatus according to the invention.

FIG. 2 illustrates, in general form, the processing of one type of data field segment 22 by transmission processor and output processor units in FIG. 4. This segment is one of 312 data segments of a given data field totalling 832 symbols. The segment illustrated by FIG. 2 includes a 187 byte MPEG-2 transport data packet prefaced by a one byte sync component and followed by an associated FEC component containing 20 Reed-Solomon parity bytes. Each transport packet as used in the Grand Alliance HDTV system includes a 4 byte link header, the first byte of which is a sync byte to facilitate packet synchronization. This may be followed by an optional adaptation header, with the remainder of the packet being MPEG data payload. The one byte sync component is mapped to 4 symbols before being 2-VSB modulated. The 187 byte MPEG packet segment and the FEC coding component are ⅔ trellis coded and mapped to 828 symbols before being 8-VSB modulated. Techniques for performing such 2-VSB and 8-VSB modulation are well known. A resulting output field segment 24 conveyed to an output channel contains a 4 symbol sync component followed by an 828 symbol data field component containing MPEG data and FEC data.

Figure 3:
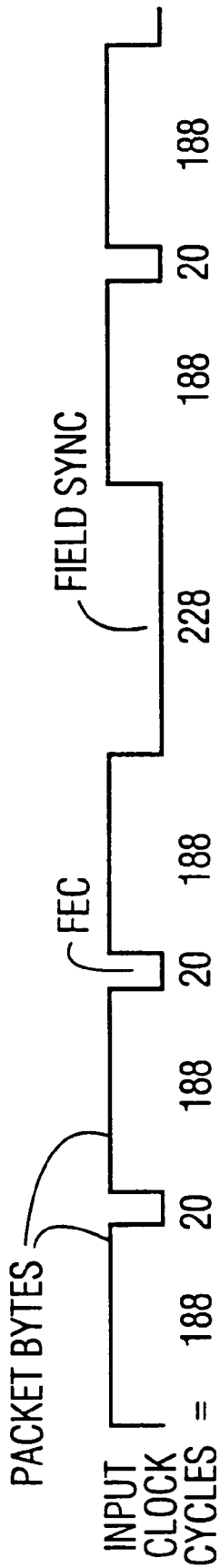
FIG. 3 depicts a packetized datastream having non-uniform overhead intervals between data packets.

FIG. 3 represents a packetized datastream in conformance with the data field structure shown in FIG. 1. Each data field has 312 segments each including sync, data and FEC components. More specifically, each data field segment includes an interval encompassing 188 data bytes including sync ("packet bytes") and an interval encompassing 20 FEC bytes. The 188 data bytes of each segment are accompanied by 188 clock intervals (cycles), and the 20 FEC bytes of each segment are accompanied by 20 clock intervals (cycles). When the time for inserting a field sync segment arrives, the transmission of data/FEC segments should be inhibited for a 228 clock cycle interval, which corresponds to a segment clock interval (ie., 20+188+20 clock cycles). The field sync segment does not contain a data payload as is contained in each packet data segment. This disruption of the data flow undesirably produces uneven intervals, or gaps, between packets as shown in FIG. 3. Such disrupted data flow and uneven inter-packet gaps greatly complicates the signal control and hardware requirements with respect to the interface between the transport and transmission processors at both the transmitter and receiver, and also reduces the data throughput rate. Moreover, it is difficult to synchronize to the data field structure when playing back pre-recorded material. The non-uniform gaps between packets greatly complicates the task of recording the packetized datastream on studio or consumer recording equipment, since the uneven inter-packet gaps must be maintained as they occurred, ie., the recording equipment must faithfully reproduce the MPEG packet timing. In addition, the uneven gaps must be maintained in an output signal produced by a demodulator at a receiver.

The described problems produced by the uneven inter-packet gaps associated with irregular overhead data are addressed and resolved by a system in accordance with the present invention. In the disclosed system a transport processor processes data packets at a constant uniform data rate in response to a clock chosen as function of the data modulation scheme being used. This clock also controls the operation of a buffer/interface network located between the transport processor and a transmission layer which processes the data in accordance with a predetermined data field structure. An advantage of the disclosed system is that it is not necessary to modify the original data field structure to achieve the desired constant uniform data rate operation. In addition, parameters such as symbol rate, segment interleaving, Reed-Solomon error coding and synchronization components are unaffected.

In the transmitter system of FIG. 4 according to the present invention, a transport processor 14 operates at an uninterrupted constant uniform data rate for providing MPEG Byte Data to a buffer interface network 16 at a uniform data rate. The MPEG Byte Data path includes video recorder/playback apparatus in accordance with the principles of the present invention as will be seen and discussed in connection with FIG. 33 to be discussed subsequently. Interface 16 provides output byte Data at a non-uniform rate to a data field construction network and coder 17. Network 17 operates at a non-uniform data rate for producing a sequence of output symbol field structures in response to the byte data and non-data overhead information (FEC and field sync). Network 17 requests data at a non-uniform rate via a Data Field Packet Request signal. Interface network 16 converts this request to a uniform data rate request signal (Packet Request To Transport) which is supplied to transport processor 14.

More specifically, transport processor 14 is included in a system transport layer, and network 17 is included in a system transmission layer (also including output processor 18) which is separated from the transport layer by interface 16. Data source 12 includes MPEG compatible data compression networks and provides MPEG-2 byte data to transport processor 14. Transport processor 14 packs the MPEG bytes into fixed length data words that are eventually formed into fixed length (188 byte) data packets. Each packet is prefaced by a header containing information illustratively denoting program source, service type and other information describing and relating to the data in the associated packet payload data. Transport processor 14 also inserts a 1-byte MPEG packet sync at the beginning of each packet. Transmission processor 10 performs operations including input buffering, FEC error detection/correction coding, field sync insertion, trellis coding to improve carrier-to-noise ratio, interleaving to reduce the impact of data burst transmission errors, and symbol mapping.

Network 17 performs a data field construction function wherein input data packets are formed into a data field structure including data, FEC and field sync components as described previously. Data packets are provided from interface network 16 to network 17 with constant uniform inter-packet gaps such that the data fields are formed by network 17 seamlessly and without interrupting the datastream. The transmission system of FIG. 4 operates in response to a symbol clock SC and clocks derived therefrom as will be discussed. A suitable symbol clock frequency is 10.762237 MHz.

The disclosed system according to the present invention achieves uniform data rate operation of the transport processor without modifying the original data field structure, e.g., one field sync segment every 312 data segments, producing a uniform data flow using a 313 segment field. Moreover, it is not necessary to interrupt the datastream for inserting field sync overhead information between data fields.

The transmitter system of FIG. 4 uses a ¼ SC clock and a ⅜ SC clock where SC is the system symbol clock. The choice of a ¼ SC clock for signal processing as will be seen results from the fact that 1 byte (8 bits) comprises 4 symbols at 2 bits/symbol. A ⅜ SC clock is preferred for 8-VSB systems, while a ¾ SC clock, also within the scope of the present invention, is preferred for faster data rate 16-VSB systems. In the system to be described, network 16 includes a FIFO buffer 46 between the output of transport processor 14 and the input of data field construction network 17. Byte data packets from transport processor 14 are read out from transport processor 14 and are written into buffer 46 in response to the ⅜ SC clock, and data packets are read out of buffer 46 to coder 17 in response to the ¼ SC clock. Both of these clocks are generated by a digital machine rather than by a more expensive phase locked loop network. The ⅜ SC signal clocks both transport processor 14 and buffer 46 so that data is transfered synchronously between the transport processor and the buffer. A similar requirement applies to the receiver as will be discussed.

Referring to FIGS. 6–9, symbol clock SC (FIG. 6) and a derived, synchronous clock ¼ SC (FIG. 7) are generated by a timing control network 40, e.g., a microprocessor, in network 17. Network 40 also generates a Data Field Packet Request signal (FIG. 10) which is synchronized to symbol clock SC since the ¼ SC clock is used to generate the Data Field Packet Request. A timing signal generator 42 in network 16 generates the ⅜ SC clock (FIG. 8) synchronous with the SC and ¼ SC clocks from timing network 40. FIG.

9 (shown for reference only) depicts a one-byte wide pulse associated with the presence of the one byte sync pulse that appears as the first byte at the beginning of every data packet.

The ⅜ SC clock is generated by counting cycles of symbol clock SC. Unit 42 generates three output pulses for every eight pulses of symbol clock SC. FIGS. 7 and 8 illustrate one possible relationship between the ¼ SC clock and the ⅜ SC clock. Any combination of 3 clock pulses within an 8 clock pulse interval may be used to develop the ⅜ SC clock, but the three pulses must have a fixed phase relationship to the ¼ SC clock, and the same relationship must be maintained between the ⅜ SC clock and the ¼ SC clock in the transmitter and receiver. The illustrated configuration of the ⅜ SC clock in FIG. 8 is advantageous in that this signal is easy to develop and align with the sync byte (which is easily detected at the beginning of each packet), and is easy to replicate at a receiver. Analogous observations pertain to the use of any six of eight symbol clocks to generate a ¾ SC clock, particularly for a 16-VSB signal. The illustrated relationship between the illustrated clocks is produced in timing control network 40 by resetting a counter at the rising edge of the ¼ SC clock that causes the packet sync byte to be output from buffer 46. The symbol clock is counted from 0 to 7, with 0 being synchronous with the packet sync byte being output from buffer 46. Any three of eight counts of symbol clock SC may be used, but the same three must also be used at the receiver/decoder.

Timing control network 40 facilitates the generation of the data field structure containing 312 data segments and one field sync segment. The Data Field Packet Request signal (FIGS. 10, 13) from network 40 exhibits a high logic level for 188 bytes and a low logic level for 20 bytes in response to the ¼ SC clock. The Data Field Packet Request signal from controller 40 (FIG. 10) exhibits non-uniform inter-packet gaps. A portion of a data field is depicted, specifically the last two data segments 311 and 312 of one data field, a field sync segment 313 at the beginning of the next data field, and the first data segment of the next data field. This signal exhibits data "enable" intervals when data is requested (each comprising 188 data bytes synchronized with 188 ¼ SC symbol clocks), and data "disable" intervals (each comprising 20 ¼ SC symbol clock intervals) when FEC information is to be added to the datastream, or 228 ¼ SC symbol clock intervals when field sync information is to be added between data fields. This signal is a free-running input to a system control network 44 associated with network 16.

Control network 44 responds to the ⅜ SC and ¼ SC clocks for generating an output Packet Request to Transport signal as shown in FIG. 11. This signal requests a 188 byte data packet from transport processor 14 every 313th clock cycle of the ⅜ SC clock. This Packet Request signal contains constant uniform gaps between packet requests for producing a uniform data rate and uninterrupted data flow. The constant uniform gaps of 125 cycles of the ⅜ SC clock between packet requests facilitates the uninterrupted seamless insertion of overhead data such as FEC information and the field sync between data fields into the data stream by network 17 to create the data field structure, as will be explained subsequently.

The disclosed system is concerned with processing a datastream having a field structure with 313 segments per field, consisting of a field sync segment followed by 312 data field segments. In this context the disclosed system will work with multiples of the ⅜ SC byte clock, e.g., faster clocks including ¾ SC, ½ SC and 3 SC in data modulation schemes including 8-VSB and 16-VSB for example. These options will be better understood after the following discussion relating FIGS. 10 and 11 to FIGS. 30, 31 and 32. From this discussion it will also become clear that the principles of the present invention are also applicable to other types of data field structures.

The waveform of FIG. 10 is a constant for the disclosed embodiment in the context of the described 313 segment data field structure. The structure of the FIG. 11 waveform may vary as a function of factors as follows. FIG. 30 corresponds to FIG. 11, which depicts the uniform data rate Packet Request sent to transport processor 14 by network 44 in response to the ⅜ SC byte clock for an 8-VSB signal. If a twice as fast ¾ SC clock is used for the same 8-VSB modulation, the Packet Request to transport processor 14 would be configured as shown in FIG. 31. Since the size of each data packet is fixed at 188 bytes, the data packet interval remains unchanged at 188 cycles of the ¾ SC clock. However, the inter-packet data disable interval has increased significantly, to 438 cycles of the ¾ SC byte clock. In this example the number of cycles in each data segment has increased to 626 (twice as many as the previous example) due to the twice as fast ¾ SC byte clock. In other words:

626 segment clocks−188 data clocks (fixed)=438 clocks

Although the number of bytes/segment has increased, the structure of the data packet remains unchanged. The structure of the data field also remains unchanged since each data field still comprises 312 segments each containing a 188 byte data packet, prefaced by a field sync segment. Analogous observations pertain to other faster clock multiples such as 3/2 SC or 3 SC, where the number of byte clocks in the interval between data packets would increase proportionally. The ⅜ SC clock has been found to be the lowest rate clock for clocking 313 bytes/segment in a 313 segment data field.

FIG. 32 illustrates the use of a faster ¾ SC clock in a higher data rate 16-VSB modulation system. The result is the same as in FIG. 30. In the 16-VSB case the symbol clock frequency (SC) doubles, and twice as many packets are throughput per unit of time compared to the 8-VSB system. The 188 byte-clock data interval and the 125 byte-clock inter-data disable interval are the same as in the 8-VSB case because of the relationship between the clock speed and the data rate of its associated modulation type. The slower ⅜ SC clock is to lower data rate 8-VSB modulation as the faster ¾ SC clock is to higher data rate 16-VSB modulation.

It can be shown that the desired symbol clock relationships (e.g., ⅜ SC, ¾ SC etc.) can be derived in accordance with the following expression which relates the symbols per field:

$$NX(188+Y)=S(X+1),$$

where

X(188+Y) and S(X+1) both represent symbols/field;

(188+Y) represents symbols/data segment;

(X+1) represents segments/field (e.g., 313);

S represents symbols/segment (e.g., 832);

X represents data segments/field (e.g., 312);

Y represents the inter-data interval; and

N is a factor to be determined.

N has been found to be ⅝ in the case of a ⅜ SC clock in an 8-VSB system, and N has been found to be ⅓ in the case of a ¾ SC clock.

Transport processor 14 is clocked by the ⅜ SC clock to read out data, and responds to the Packet Request signal from unit 44 by delivering the 188 bytes of an MPEG data packet during 188 cycles of the ⅜ SC clock, as represented by FIG. 12. FIG. 12 actually depicts a Data Valid signal that is output by transport processor 14 simultaneously with the 188 byte data packets. The Data Valid signal exhibits the form of the Packet Request To Transport signal (FIG. 11). The Data Field Packet Request from timing circuit 40 in network 17 (FIG. 10) is not synchronous with the Packet Request To Transport signal from network 44 (FIG. 11).

The data packets from transport processor 14 (Data) are applied to buffer 46 in network 16. This buffer is relatively small, several packets in depth. Buffer 46 also receives the Data Valid signal at a Write Enable (WEN) input to enable the data packets to be written to buffer 46 in response to the ⅜ SC Write clock (WCK). Buffer 46 also receives a Start Of Packet (SOP) flag from transport processor 14. This flag is generated at the beginning of each data packet concurrent with the sync byte which prefaces each data packet. Requests for transport processor 14 to send a packet of data to network 17 via interface network 16 are not honored until buffer 46 has reached a predetermined fullness level, e.g., half full. The fullness level of buffer 46 is indicated by a Fullness flag, which is applied to a control input of controller 44.

A 188 byte data packet is clocked into buffer 46 every $^{188}/_{313}$ cycles of the ⅜ SC clock (FIGS. 11 and 12). During the remaining 125 cycles of the ⅜ SC clock, no data is clocked into FIFO 46. The input data rate to buffer 46 is uniform and exactly matches the output data rate from buffer 46. The output data rate is controlled by the Data Frame Packet Request signal from circuit 40. The Data Frame Packet Request signal and the Packet Request to Transport signal are not synchronous but are related through the ⅜ SC and ¼ SC clock relationships.

Controller 44 contains logic networks responsive to the ⅜ SC clock, to the Data Field Packet Request signal, to the buffer Fullness flag (FIG. 15) from buffer 46, and to the Start of Packet (SOP) flag received from an alignment network 45 via buffer 46. Controller 44 provides a control signal (FIG. 14) to the Read Enable (REN) input of buffer 46 to enable buffered transport packet data to be read out to network 17 at the appropriate time. This occurs as follows with reference to FIGS. 13–16. The FIG. 13 signal is similar to the previously discussed FIG. 10 signal.

Normally, the Read Enable signal (FIG. 14) is synchronous with the Field Data Packet Request signal (FIG. 13). The SOP flag that normally appears at the beginning of each data packet causes controller 44 to provide an output to the REN input of buffer 46 to stop buffer 46 from reading out data. Specifically, controller 44 is programmed to respond to the SOP flag by reading out buffer 46 for 188 bytes, then stopping buffer read out for the 20 byte FEC interval. This allows FEC network 50 in transmission coder 17 to calculate error coding information for the packet that immediately precedes the current packet being held in buffer 46. This error coding information is inserted into the datastream during the 20 byte FEC overhead interval at the end of the preceding packet. Both the Data Field Packet Request (FIG. 13) and the buffer Read Enable signal when present (FIG. 14) exhibit a non-uniform inter-packet gap structure required for inserting the 20 byte FEC overhead information by unit 50 of network 17, and for inserting the longer duration field sync overhead information by unit 58. This insertion of overhead information is accomplished without interrupting the datastream.

Referring to FIG. 4, inserting the field sync segment without stopping or disrupting the datastream is facilitated by the manner of read/write clocking of buffer 46 in combination with the predetermined buffer fullness level. Packets are continuously written into buffer 46 from the transport processor as packets are requested. Over one data field period, the exact number of data bytes needed to constitute a data field will have been transferred from transport processor 14 to buffer 46. Buffer 46 is relatively small, in this example large enough to accomodate 4 data packets. The predetermined buffer fullness level is 2 data packets, but this level may vary with the requirements of a particular system. In practice, this level should be determined so that, for the known data internals and data disable intervals in a given system, the buffer will not overflow when buffer read out is stopped to insert overhead information into the datastream, and will not empty at other times. When buffer read out is momentarily stopped to insert overhead information (e.g., field sync) into the datastream, data packets continue to be written to buffer 46 at a constant uniform rate (FIG. 11). During this time buffer 46 does not fill up completely. The constant uniform gap between data packets (FIG. 11) allows enough time for buffer 46 to refill while read out is momentarily disabled for overhead insertion. After the overhead has been inserted during the read disable interval, data is again read out from buffer 46. During all of this time transport processor 14 has been continuously sending data packets to buffer 46, whereby the datastream flows without interruption while transport 14 processes data packets without interruption.

When a faster byte clock is used, e.g., ¾ SC or ½ SC, buffer 46 will not run empty because the inter-packet intervals in 8-VSB mode are longer. This allows additional time for the buffer to refill from the transport processor.

The buffer 46 Read Enable is also disabled by controller 44 if the buffer Fullness flag exhibits a low logic level, indicating that buffer 46 contains less than a predetermined number of data packets. At this time the Data Valid signal from network 44 (FIG. 16) is "low" (absent) since the reading out of buffer 46 has been disabled. This condition may occur, for example, when system operation is initiated or after a system reset, e.g., at a time T1. Typically the data field structure is initiated at the beginning of the transmission day, and the transmission of data packets continues uninterrupted from then until station sign-off at the end of the transmission day. During this time, while reading out of buffer 46 is disabled, transport processor 14 continues to send data packets to buffer 46 in response to the Packet Request To Transport signal from controller 44. After a preternined number of packets has been stored and the buffer fullness condition has been satisfied, the Fullness flag (FIG. 15) changes state and exhibits a high logic level. Buffer 46 again receives a Read Enable signal for outputting data packets. The buffer Read Enable operation is initiated at the leading edge of the first data enable interval that appears after the Fullness flag goes high in response to the fullness condition being satisfied. Consequently, at a time T2, the first (sync) byte of a data packet is aligned with the beginning of a packet request from the Data Field Packet Request signal (FIG. 13) and with the beginning of the Data Valid signal (FIG. 16).

Figure 28:
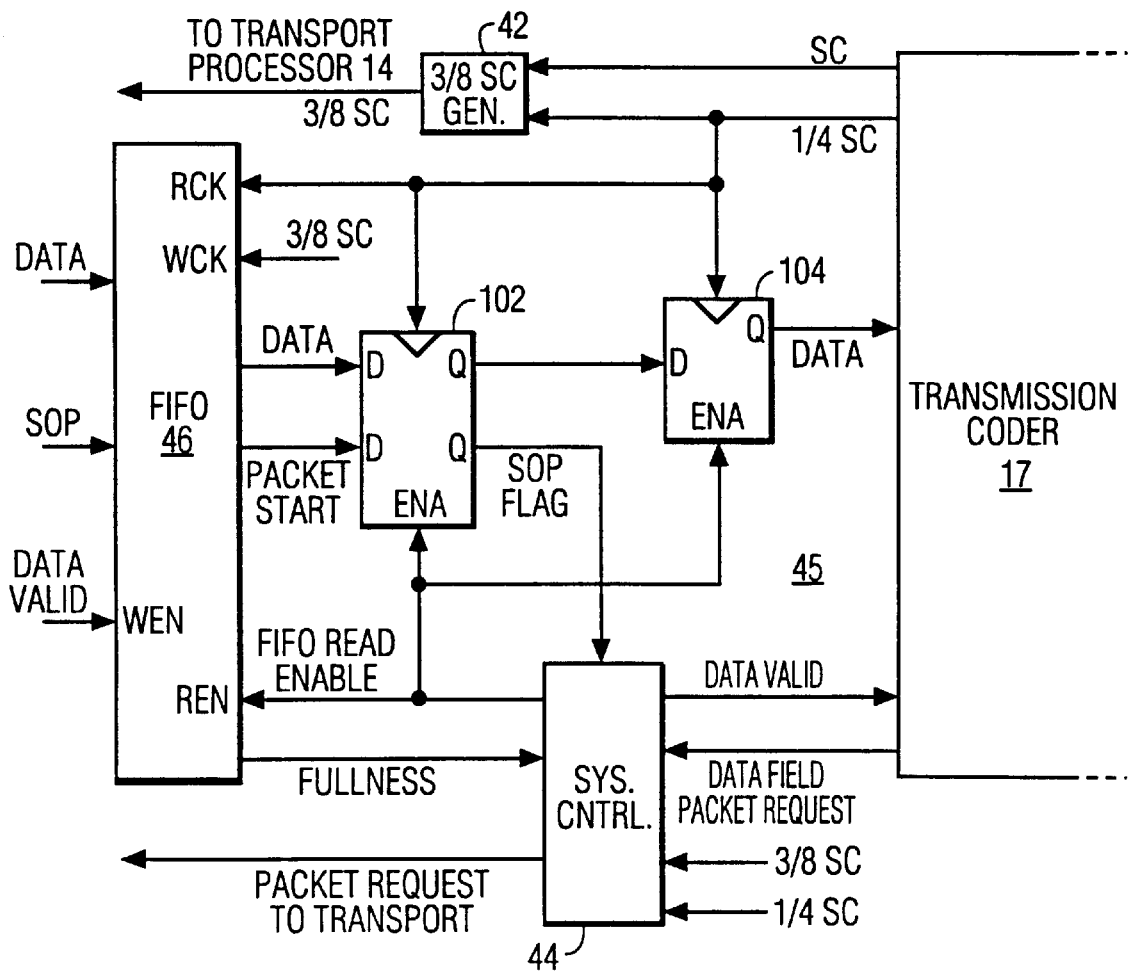
FIGS. 28 and 29 respectively show additional details of the systems of FIGS. 4 and 17.

Alignment circuit 45 in FIG. 4 facilitates the above-described operation illustrated by FIGS. 13–16. Circuit 45 is shown in FIG. 28 together with networks 17, 42, 44 and 46 of FIG. 4. Alignment circuit 45 comprises cascaded "D" type flip-flops (registers) 102 and 104 which are clocked by the ¼ SC Read Clock of buffer 46, and which are enabled by the Read Enable input (REN) provided to buffer 46 from system controller 44. Data from buffer 46 is conveyed via flip-flops 102 and 104 to transmission coder 17. Controller 44 produces a buffer Read Enable signal in response to a Start Of Packet (SOP) flag (a register delayed version of the input Packet Start signal) from an output of flip-flop 102. The Packet Start signal is a buffer delayed version of the SOP signal input to buffer 46.

Continuing with FIG. 4, output 8 byte parallel Data packets from network 45 and the Data Valid signal (FIG. 16) are applied to respective inputs of FEC unit 50 in transmission coder 17. FEC unit 50 adds 20 bytes of FEC data to the datastream during the data "invalid" overhead intervals between each data packet interval in accordance with the waveform of FIG. 16. The datastream from FEC unit 50 is applied to a parallel-to-serial data converter 52. Unit 52 converts each paralled 8 bit byte into a group of four 2 bit words which are output serially. Using well-known techniques, the data from unit 52 are ⅔ trellis coded by unit 54 for producing three output bits (two information bits and one derived redundancy bit) for every two input bits to improve signal-to-noise performance. These bits are provided according to a predetermined algorithm, examples of which are known in the art. Coder 54 operates in conjunction with bit generator unit 56, which provides the third bit in accordance with the predetermined algorithm.

The output of trellis coder 54 comprises a sequence of 3 bit trellis coded words, with four 3 bit words constituting a byte. Symbol mapper 58 maps each 3 bit input word from coder 54 to one output symbol, and time multiplexes these output symbols with a field sync component of predetermined value from unit 60 to produce an output symbol datastream. In the mapping function of unit 58, eight progressively increasing numerical binary output values from unit 54, from 000, 001, 010, . . . to 111, are translated into the following eight symbol levels, respectively $$-7\ -5\ -3\ -1\ +1\ +3\ +5\ +7.$$

Control signals for field sync generator 60 and mapper 58 are provided by timing control network 40, e.g., a microprocessor. Network 40 controls the operation of field sync generator 60 so that unit 60 is enabled to output field sync segment information during an interval of predetermined duration produced between adjacent data fields, ie., after every 312 data segments as discussed. Each field sync segment is predictably multiplexed into the data stream between groups of field data without interrupting the data flow, as previously discussed regarding the operation of buffer 46. Multiplexer 58 also replaces the MPEG sync component at the beginning of each packet with a segment sync before output processing by unit 18.

Figure 5:
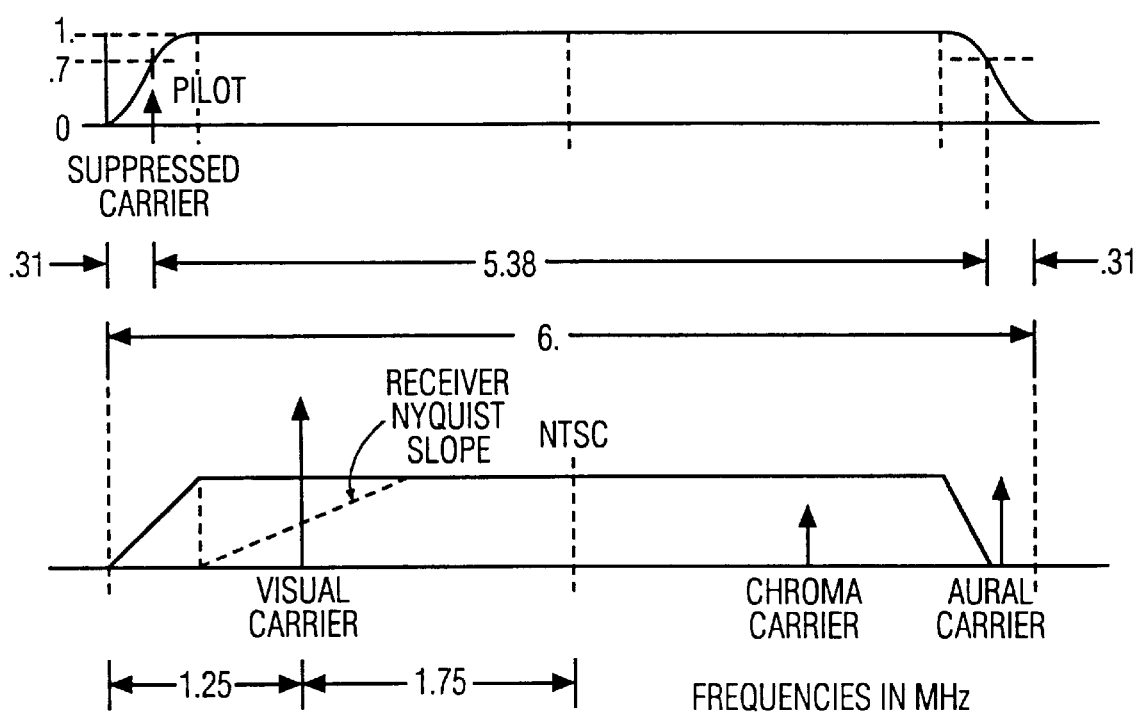
FIG. 5 illustrates a television channel spectrum that may be used to convey output data provided by the system of FIG. 4, shown in relation to a conventional NTSC television channel spectrum.

An 8-level symbol data signal from unit 58 is provided to output processor 18, where a small pilot signal may be added to a suppressed RF carrier to allow robust carrier recovery at a receiver under difficult reception conditions. Using known signal processing techniques, an 8-VSB modulator in processor 18 receives the trellis coded composite data signal, filters and spectrum shapes the signal for transmission over a standard 6 MHz television channel, modulates (upconverts) the data signal onto an intermediate frequency (IF) carrier, and translates the resulting signal to an RF carrier. FIG. 5 depicts, in the upper diagram, the spectrum of the baseband VSB modulation signal for this example, relative to a standard 6 MHz NTSC channel spectrum as shown in the lower diagram.

Figure 17:
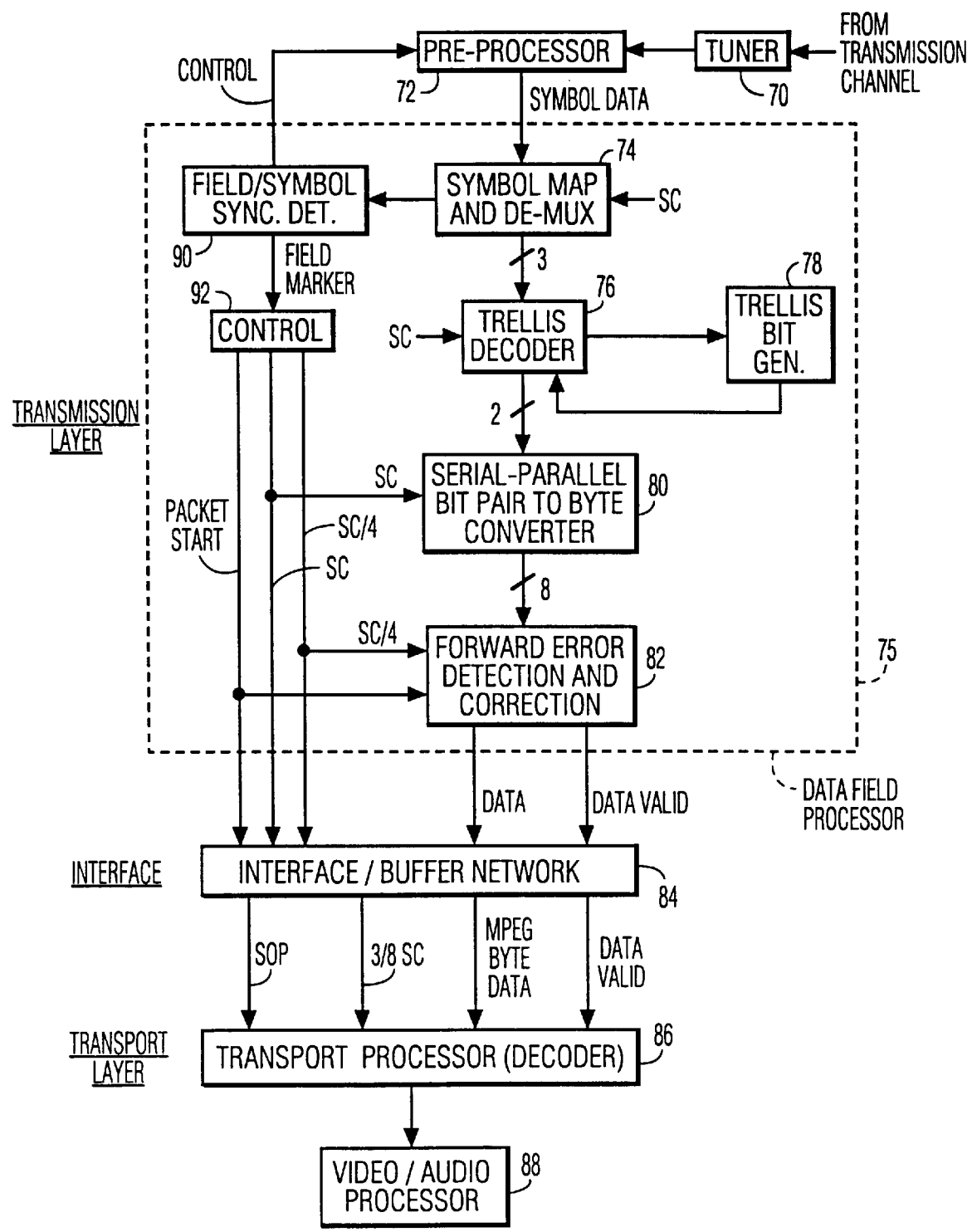
FIG. 17 is a block diagram of a receiver decoder, including a baseband data field processor and buffer/interface network, suitable for use with video recorder apparatus according to the invention, for providing output data to a transport processor.

FIG. 17 depicts a VSB receiver incorporating the principles of the present invention. A baseband demodulated Symbol Data datastream from a preprocessor 72 exhibits a sequential data field structure as described previously, with a non-uniform data rate. A data field processor 75 associated with a system transmission layer processes the symbol data field structure with a non-uniform data rate to produce output Data at a non-uniform rate. A buffer interface network 84 converts this data to an MPEG Byte datastream exhibiting a constant uniform data rate. This datastream is processed by a transport decoder 86 which exhibits uninterrupted operation at a constant uniform data rate for providing decoded byte data to an output processor 88. Transport decoder 86 is associated with a system transport layer. The MPEG Byte Data path includes video recorder/playback apparatus in accordance with the principles of the present invention as will be seen and discussed in connection with FIG. 34 to be discussed subsequently.

More specifically, a signal received from a transmission channel is processed by an RF tuner 70 including channel selection and mixer circuits to produce a frequency downconverted signal. This signal is subjected to IF filtering and synchronous detection by pre-processor unit 72 using known signal processing techniques to produce a baseband signal. Unit 72 also includes an equalizer to compensate for transmission channel amplitude and phase perturbations. A Symbol Data output signal from unit 72 is afterwards subjected to trellis decoding, forward error detection/correction and other signal processing in a manner which is the inverse of the processing performed by the transmitter system of FIG. 4.

Symbol clock SC and derived clocks ¼ SC and ⅜ SC are identical to corresponding clocks at the transmitter. Thus an output datastream (MPEG Byte Data) provided to a transport processor/decoder 86 corresponds to the datastream (MPEG Byte Data) provided from transport processor 14 in the FIG. 4 transmitter system. The input Symbol Data applied to symbol mapper and de-mux unit 74 corresponds to the Output Symbol Data from network 17 in FIG. 4. The input Symbol Data datastream contains a relatively long duration field sync component between groups of shorter duration data packets that respectively define adjacent data fields (FIGS. 1 and 3). Thus the receiver input symbol datastream exhibits a non-uniform data rate. Before being applied to receiver transport processor 86, this non-uniform rate input symbol datastream is converted to an MPEG Byte Data output signal (from network 84) which contains data packets occurring at a constant uniform data rate separated by uniform inter-packet gaps. Such a constant uniform rate datastream advantageously facilitates data processing and data de-multiplexing by transport decoder 86, which operates without interrupting the datastream.

More specifically, a non-uniform rate baseband input symbol datastream produced after demodulation and equalization is applied to symbol mapper and de-multiplexer 74, which performs the inverse of the operations performed by mapper 58 in FIG. 4. Unit 74 maps each symbol to a 3 bit word which is trellis decoded to a 2 bit word by trellis decoder 76 in conjunction with unit 78. Unit 74 also replaces the segment sync at the beginning of each segment packet with an MPEG packet sync. A symbol datastream processed by unit 74 is monitored by unit 90 to detect the appearance of Control information present during field sync intervals, e.g., so-called "training" signal information for use by a preceding equalizer in unit 72, mode selection information, and other information. This information is extracted by unit 90 and conveyed to preceding circuits in accordance with the requirements of a particular system.

Output groups of four 2 bit data words from trellis decoder 76 are converted from serial form to 8 bit (1 Byte) parallel form by serial-to-parallel converter 80. Serial words from converter 80 are applied to error detection and correction unit 82, e.g., a Reed-Solomon decoder. An error corrected Data signal from unit 82 is applied to receiver buffer/interface network 84 together with a Data Valid signal, clocks SC and ¼ SC, and a Packet Start signal from controller 92. The SC symbol clock and the ¼ SC clock are synchronous and are produced by a local oscillator in controller 92. The Packet Start Signal is generated in response to the appearance of the sync byte at the beginning of each packet. FEC unit 82 generates the Data Valid signal in response to the Packet Start signal.

Figure 29:
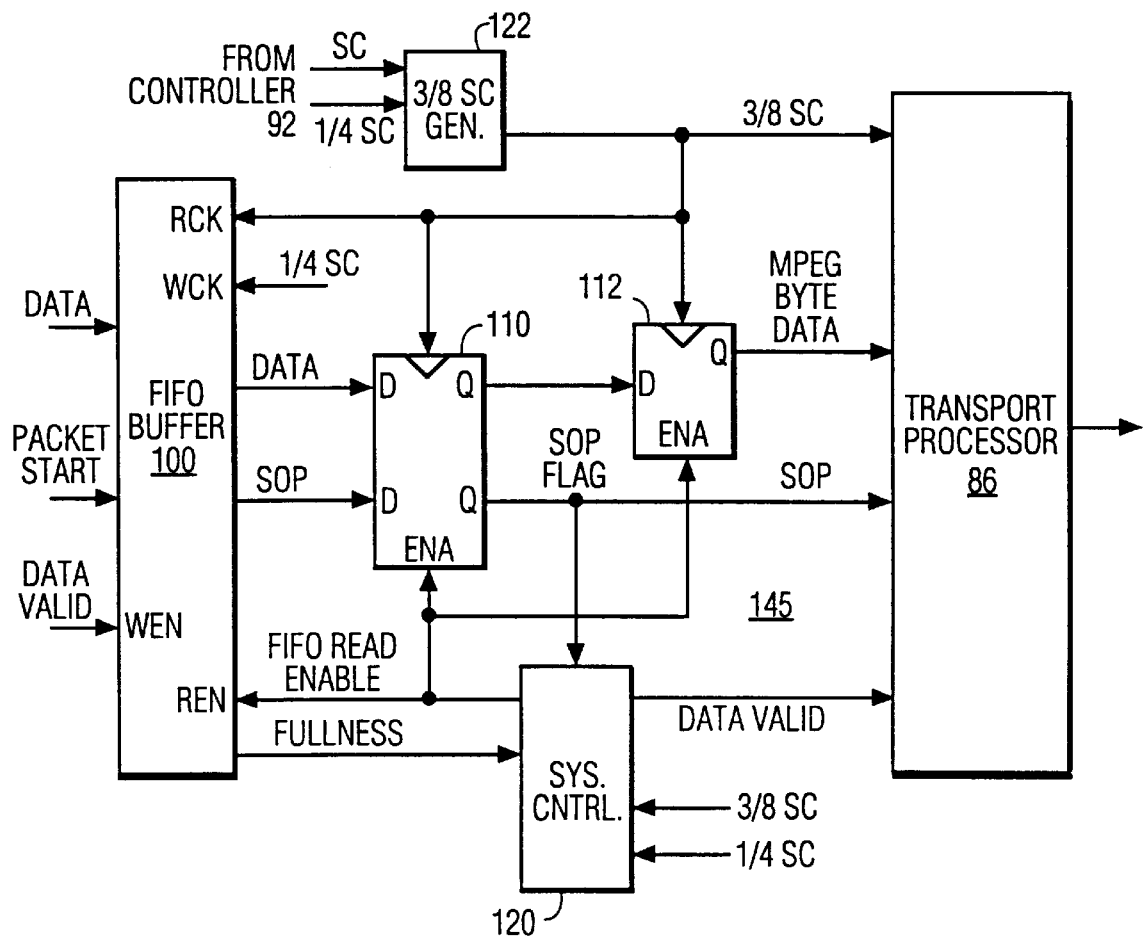

Buffer/interface network 84 is similar to transmitter network 16 and is shown in FIG. 29. The interface network of FIG. 29 includes a FIFO buffer 100, a system controller 120, a ⅜ SC clock generator 122 and an alignment circuit 145, all of which elements exhibit characteristics similar to those of counterpart elements for transmitter network 16 shown in FIG. 28. Buffer 100 of FIG. 29 is essentially the same as FIFO buffer 46 in transmitter buffer network 16 in FIG. 4, except that the Read and Write clocks are interchanged. Specifically, the Write clock input WCK of buffer 100 responds to the ¼ SC clock, and the Read clock input RCK of buffer 100 responds to the ⅜ SC clock. In FIG. 29 the SOP input signal to register 110 is a buffered version of the Packet Start signal, and the SOP input to transport processor 86 is a delayed version of the SOP input to register 110.

Continuing with FIG. 17, a packetized baseband MPEG byte datastream from network 84 is processed by a transport processor/decoder 86, which basically performs the inverse of the operations performed by transport processor 14 at the transmitter (FIG. 4). Transport processor 86 decodes data into its constituent components. Processor 86 includes various data processing and demultiplexing circuits including header analysers, signal routers responsive to header information, MPEG decompression networks and other image and audio data processors which provide signals that are formatted as required by video/audio processor 88 in FIG. 17. Video and audio data recovered by transport decoder 86 are respectively processed by video and audio networks in a unit 88 to provide image and sound information suitable for reproduction.

Detector 90 in network 75 also provides a Field Marker signal to control unit 92. The Field Marker instructs controller 92 not to write the field sync segment to buffer network 84, whereby a resulting output datastream is devoid of the field sync component. Output data packets from buffer network 84 form a single datastream that is devoid of the field sync component, whereby the MPEG Byte Data datastream from network 84 exhibits a constant, uniform data rate and constant, uniform inter-packet gaps.

Removing the overhead field sync segment without stopping or disrupting the datastream is facilitated by the manner of read/write clocking of buffer 84 in combination with the predetermined buffer fullness level. Packets are continuously read out of buffer 46 to the transport processor as packets are available. Over one data field period, the exact number of data bytes needed to constitute a data field will have been transferred to transport processor 86 from buffer 84. Buffer 84 exhibits the same size and fullness requirement as buffer 46 at the transmitter. When writing to buffer 84 is momentarily disabled to remove overhead information (e.g., field sync) from the datastream, data packets continue to be read out to transport processor 86 at a constant uniform rate. During this time buffer 84 does not empty completely. The constant uniform gap between data packets allows enough time for buffer 84 to empty partially while writing in is momentarily disabled to remove the overhead information from the datastream. After overhead information has been removed during the write disable interval, data is again written to buffer 84. During all of this time transport processor 86 has been continuously receiving data packets from buffer 84, whereby the datastream flows without interruption while transport 86 processes data packets without interruption.

The waveforms shown in FIGS. 18–27 pertain to receiver operation. Clock synchronization at the receiver is achieved by using the packet sync byte, which as explained previously is the first byte of every data packet. As in the case of the transmitter, after the sync byte at the beginning of a packet is sensed (FIG. 21) a symbol clock SC (FIG. 18) and a mutually synchronized ¼ SC clock (FIG. 19) are generated. Also as in the transmitter, a counter is used to count cycles of the ¼ SC clock for producing the receiver ⅜ SC clock (FIG. 20). This counter is reset to zero synchronously with each packet sync byte. The observations made previously with respect to the structure and characteristics of the ⅜ SC symbol clock at the transmitter also apply to the ⅜ SC clock at the receiver. The ¼ SC clock and the ⅜ SC clock should be identical at the transmitter and receiver.

FIG. 22 illustrates the output Data Valid timing signal produced by unit 82 of network 75 concurrent with the Data signal from processor 75. The shape of the Data Valid signal corresponds to the shape of the Data signal from processor 75. This Data Valid timing signal exhibits a non-uniform characteristic with non-uniform inter-packet gaps, including a 20-(clock) count gap corresponding to inserted FEC data in the Data signal, and a significantly wider, 228-count gap corresponding to the inserted field sync in the Data signal. Data packets in the Data signal appear during the positive-going 188 count intervals of the Data Valid signal. Thus the Data signal from network 82 exhibits a non-uniform data flow with respect to the packet data. The counterpart of the FIG. 22 Data Valid signal at the transmitter is shown in FIGS. 3 and 10.

In contrast, the Data Valid signal provided from buffer network 84 to transport processor/decoder 86 (FIG. 23) exhibits a uniform structure with uniform inter-packet gaps. This signal signifies that the MPEG Byte Data datastream from buffer network 84 is constituted by constant uniform inter-packet gaps ("data disable" intervals of 125 counts of the ⅜ SC clock) between constant uniform data packets ("data enable" intervals of 188 counts of the ⅜ SC clock). Thus the MPEG Byte Data datastream exhibits a constant uniform data flow to facilitate the uninterrupted operation of transport processor 86. In response to the Data Valid signal of FIG. 23, transport processor 86 acquires data packets for processing during each 188-count clock interval based on an uninterrupted flow of data. Transmitter counterparts of the FIG. 23 Data Valid signal are shown in FIGS. 11 and 12.

Receiver buffer/interface network 84 operates in a manner similar to that of the counterpart transmitter network shown in FIG. 28. As noted previously, the respective FIFO buffers differ with respect to the Read and Write clock inputs. Also, whereas transmitter system controller 44 in FIG. 28 provides a Packet Request To Transport signal in response to a Data Field Packet Request, the counterpart receiver network in FIG. 29 sends an SOP flag to receiver transport processor 86 to indicate the beginning of a new packet. As in the case of counterpart buffer 46 at the transmitter, receiver buffer 100 in FIG. 29 is cleared and refilled to a predetermined level each time the receiver system is reset. Buffer 100 must reach a predetermined "fullness" level before data is permitted to be read out. This operation is illustrated by FIGS. 24–27 and is analogous to the related transmitter operation previously discussed with respect to FIGS. 13–16.

Controller 120 generates a free-running internal timing waveform shown in phantom form in FIG. 24. This signal exhibits a constant uniform structure. Specifically, this signal is constituted by constant uniform intervals of 125 counts of the ⅜ SC clock (corresponding to inter-packet data disable intervals) between constant uniform intervals of 188 counts of the ⅜ SC clock (corresponding to data packet data enable intervals). From this signal controller 120 produces a FIFO Read Enable signal (FIG. 25) for buffer 100 and a Data Valid signal (FIG. 27) for transport processor 86, both with a constant uniform structure. These signals are produced in response to the buffer Fullness signal (FIG. 26) and the SOP flag input to register 110. This flag is a buffered and delayed version of the Packet Start signal. The (register delayed) SOP output of register 110 is applied to a control input of unit 120 and to transport processor 86. The buffer Fullness signal is produced when buffer 100 exhibits a predetermined fullness. The buffer Read Enable operation is initiated at the leading edge of the first (positive going) data Enable interval that appears after the Fullness signal goes high in response to the buffer fullness condition being satisfied. Consequently, at a time T2, the first (sync) byte of a data packet is aligned with the beginning of a valid data interval of the Data Valid signal (FIG. 27).

Both flip-flops and the Read clock (RCK) input of buffer 84 are clocked by the ⅜ SC clock locally generated by unit 122 in response to the SC and ¼ SC clocks as discussed previously. The ⅜ SC clock is also applied to controller 120. MPEG Byte Data are conveyed via flip-flops 110 and 112 to a data input of transport processor 86 when these flip-flops are enabled by the Read Enable signal produced by controller 120. At the same time, the SOP flag is conveyed to transport processor 86 together with the Data Valid signal (FIG. 27) from controller 120. The Data Valid signal is provided to transport processor 86 to enable it to acquire data during intervals when valid packet data are present.

The interface between the transport processor and the transmission processor including network 17 is important in many applications. In television broadcast for example, the transmission processor will be required to generate and output data fields without interruption once transmission has begun. Television receivers rely on this uninterrupted stream of data fields including field sync segments to maintain synchronization. Any change in the data field rate or structure during broadcast would result in a loss of synchronization at the receiver. A broadcast studio normally has multiple banks of video tape players pre-programmed to automatically switch to appropriate source material in a timed manner. These tape players output transport packets containing transport stream information. Each tape player synchronizes its output to the flow of data to the transmission processor, which is not permitted to alter its field rate or field structure. Non-uniform gaps in the flow of packets from the transport processor to the transmission processor have the effect of making the transmission data field structure an artifact in the data flow at the interface, which would have both a packet and a data field structure. Each studio recorder would be undesireably required to have complicated interfaces that synchronize the tape output to both the packet and field boundaries. Additional information about the field structure would be required to be passed across the interface, or developed by monitoring the data flow at the interface. The tape interface would contain provision for packet sync detection, field detection and sufficient memory to buffer the data field structure. Additional complications are produced by pre-recorded tapes, and insertion of local programming and commercials. These complications and other difficulties are successfully resolved by a recording/playback system employing the principles of the present invention, as shown in FIGS. 33 and 34.

Figure 33:
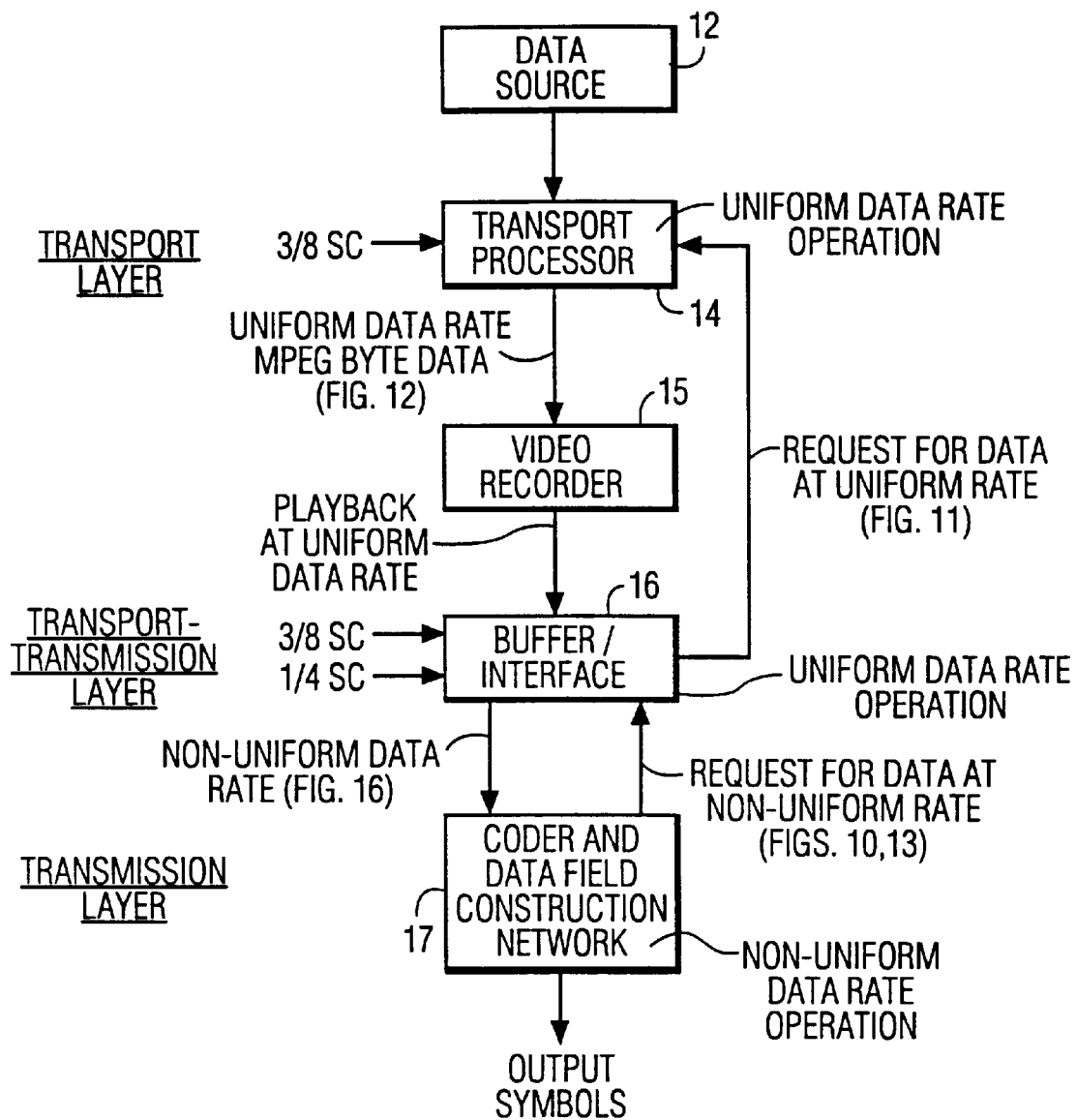
FIGS. 33 and 34 respectively illustrate apparatus as disclosed in FIGS. 4 and 17 together with a video recording/playback device situated in accordance with the principles of the present invention.
Figure 34:
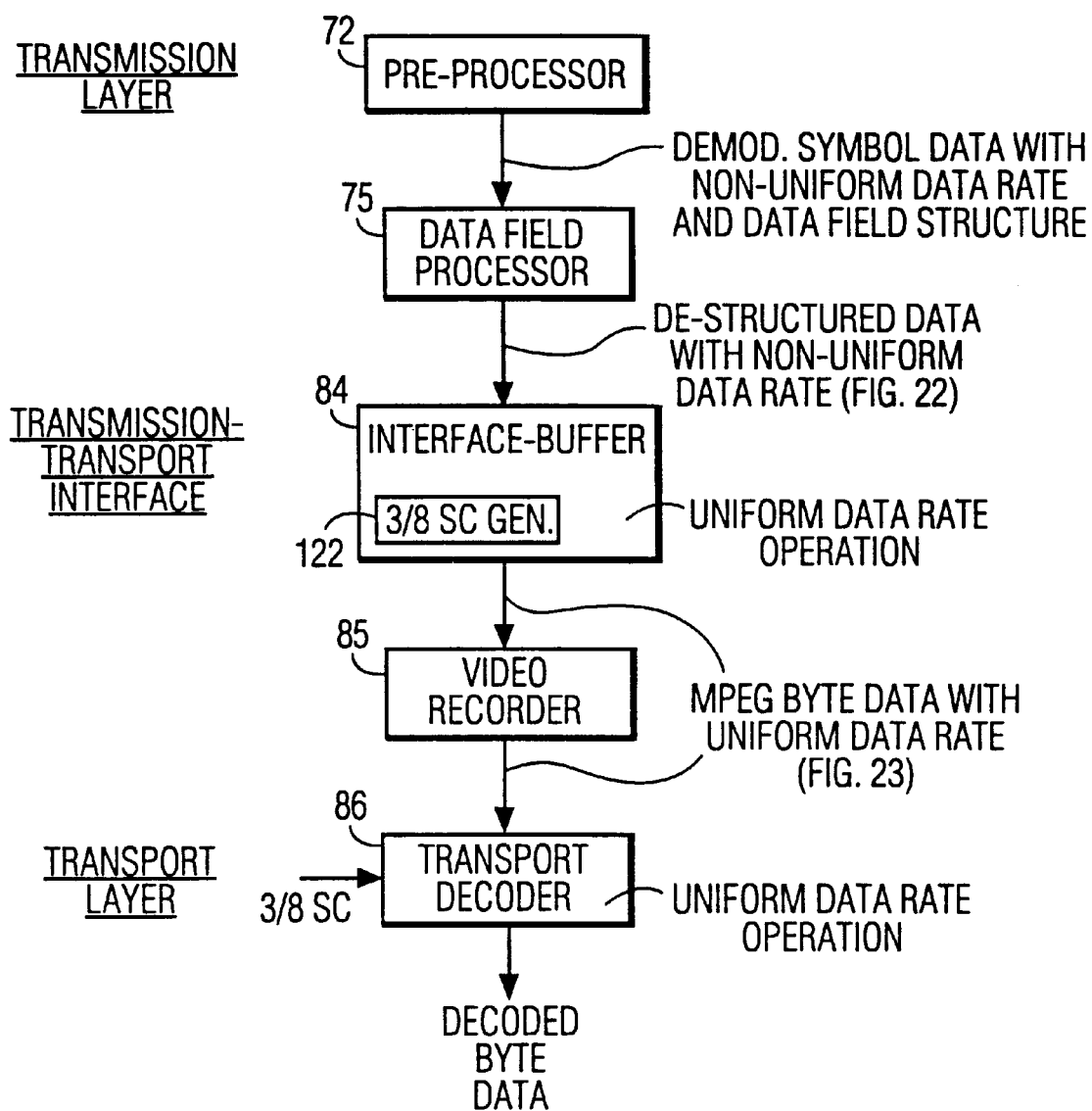

FIGS. 33 and 34 respectively represent the transmitter and receiver systems shown in FIGS. 4 and 17, except that the systems of FIGS. 33 and 34 include a video recorder device. In FIG. 33 a video tape recorder/playback device 15 receives a uniform data rate datastream from transport processor 14, a provides playback data at a uniform rate to coder and data field construction network 17 via buffer/interface 16. As in the case of the FIG. 4 system, the FIG. 33 system exhibits a uniform data flow at the interface between the transport layer and the transmission layer. In this example data source 12 includes a broadcast studio video camera and an MPEG coder for encoding camera output signals prior to packetizing by transport processor 14.

Video recorder 15 may be a commercial device such as a Panasonic™ D3 video tape recorder for providing byte-by-byte recording to tape. In some video recorder designs interface 16 may be included in the recorder device itself. Recorder 15 may comprise one of a bank of several video recorders commonly employed at broadcast studios as known to facilitate the transmission of various type of program material from the studio.

In FIG. 34 a video tape recorder/playback device 85 receives and processes a uniform data rate datastream (with overhead information removed) from interface/buffer 84, and provides playback data at a uniform rate to transport processor/decoder 86. The system of FIG. 34 also exhibits a uniform data flow at the interface between the transmission layer and the transport layer. In this system recorder 85 represents a consumer device (VCR) capable of recording off-the-air, or for playing back material such as may have been pre-recorded by a device having the characteristics of unit 15 in FIG. 33. Unit 85 may be a separate unit in a system where elements 72, 75, 84 and 86 are incorporated in a television receiver. Alternatively, elements 72, 75, 84 and 86 may all be included in recorder 85.

What is claimed is:

1. A system for transmitting a digital datastream constituted by fixed length transport packets compatible with the Grand Alliance high definition television system and representing sequential data fields containing equal transport packet data intervals and unequal overhead information intervals between transport packets, said system comprising:

a data processor for providing a constant uniform data rate datastream;

video recorder/playback apparatus for receiving said uniform rate datastream from said data processor; and a data field generator responsive to an output datastream from said video recorder/playback apparatus for inserting overhead information into said unequal overhead intervals between transport packets of said datastream, without interrupting said datastream, to form said field structured datastream representing sequential data fields with equal data intervals and unequal overhead intervals between transport packets.

2. A system for receiving a digital datastream constituted by fixed length transport packets representing sequential data fields containing equal transport packet data intervals and unequal overhead information intervals between transport packets, said system comprising:

a data processor responsive to said received field structured digital datastream for removing overhead information between transport packets from said datastream without interrupting said datastream;

means for conveying an output datastream from said data processor to an output terminal at a constant uniform data rate; and video recorder/playback apparatus for receiving a datastream having a constant uniform data rate from said output terminal.

3. A system according to claim 2, wherein said datastream representing sequential data fields is compatible with the Grand Alliance high definition television system, said datastream comprising a plurality of multilevel symbols formatted in groups of successive fields, each field comprising a fixed number of repetitive equal length data segments and a field synchronizing segment of the same length, where one of said unequal overhead intervals is for occupancy by overhead data respectively associated with each segment, and where a larger of said unequal overhead intervals is for occupancy by said field synchronizing segment; and said datastream is MPEG compatible.

4. A system according to claim 2 and further including a data decoder (86) responsive to an output datastream from said video recorder/playback apparatus and operative at a constant uniform data rate for providing an output decoded uniform data rate datastream without interruption.

5. A method of recording a video signal in a system for receiving a field structured digital datastream constituted by fixed length transport packets representing sequential data fields containing equal transport packet data intervals and unequal overhead information intervals between transport packets, said method comprising the steps of:

(a) removing overhead information between transport packets from said datastream, without interrupting said datastream, to produce a datastream with a non-uniform data rate; and (b) conveying said datastream processed by processing step (a) to recording/playback apparatus at a constant uniform data rate.

6. A method according to claim 5, comprising the further step of (c) decoding (86) output data from said recording/playback apparatus in step (b) at a constant uniform data rate without interruption.

7. A method according to claim 5, wherein said datastream representing sequential data fields is compatible with the Grand Alliance high definition television system, said datastream comprising a plurality of multilevel symbols formatted in groups of successive fields, each field comprising a fixed number of repetitive equal length data segments and a field synchronizing segment of the same length, where one of said unequal overhead intervals is for occupancy by overhead data respectively associated with each segment, and where a larger of said unequal overhead intervals is for occupancy by said field synchronizing segment; and said datastream is MPEG compatible.

8. A system for transmitting a digital datastream constituted by fixed length transport packets compatible with the Grand Alliance high definition television system representing sequential data fields containing equal transport packet data intervals and unequal overhead information intervals between transport packets, said system comprising:

a data processor for providing a constant uniform data rate datastream;

video recorder/playback apparatus for receiving said uniform rate datastream from said data processor;

a data field generator responsive to an output datastream from said video recorder/playback apparatus for inserting overhead information into said unequal overhead intervals between transport packets, without interrupting said datastream, to form said field structured datastream representing sequential data fields with equal data intervals and unequal overhead intervals between transport packets; and a modulator responsive to said datastream from said data field generator to produce a Vestigial Sideband (VSB) modulated signal for transmission; wherein said overhead information includes data overhead information and field sync overhead information respectively occupying overhead intervals of unequal duration between transport packets.

9. A system according to claim 8, wherein said field structured datastream comprises a sequence of fields each including (a) a plurality of data segments each including a data interval and a data overhead interval, and (b) a field sync segment containing said field sync overhead information prefacing said plurality of data segments.

10. A system according to claim 9, wherein said data overhead interval is the smaller of said unequal overhead intervals and contains FEC error correction data; and the larger of said unequal overhead intervals contains said field sync segment.

* * * * *